United States Patent [19]
Miller et al.

[11] Patent Number: 5,396,041
[45] Date of Patent: Mar. 7, 1995

[54] DRILL RESISTANT HARD PLATE AND METHOD FOR MANUFACTURE THEREOF

[76] Inventors: J. Clayton Miller, 5085 Danville Rd., Nicholasville, Ky.; Kevin Rafferty, 193 Countryview Dr., Harrison, Ohio 45030; Leonard Wetz, 7588 Baron Ct., West Chester, Ohio 45069

[21] Appl. No.: 831,220

[22] Filed: Feb. 7, 1992
(Under 37 CFR 1.47)

[51] Int. Cl.⁶ .............................................. B23K 9/04
[52] U.S. Cl. .......................... 219/76.15; 219/137 WM; 109/85
[58] Field of Search ....... 219/137 WM, 137 R, 76.15, 219/76.12; 109/78, 80, 85

[56] References Cited

U.S. PATENT DOCUMENTS

| | | | |
|---|---|---|---|
| 4,859,541 | 8/1989 | Maxeiner et al. | 109/85 |
| 5,007,326 | 4/1991 | Gooch, Jr. et al. | 109/85 |
| 5,147,996 | 9/1992 | Carlin | 219/76.12 |

FOREIGN PATENT DOCUMENTS

| | | | |
|---|---|---|---|
| 142516 | 7/1980 | Germany | 219/76.15 |

OTHER PUBLICATIONS

Specification Sheet Titled "Borium, the Ultimate in Wear Resistance".
Specification Sheet Titled "Republic 100-AR Abrasion Resistant Steel Plate".

*Primary Examiner*—Clifford C. Shaw
*Attorney, Agent, or Firm*—Lowe, Price, LeBlanc & Becker

[57] ABSTRACT

A highly drill-resistant element, suitable for inclusion into the walls and/or doors of a security container to resist drilling to access the contents of the container is formed by welding onto a steel plate formed of REPUBLIC 100-AR (TM) steel a layer of Tube BORIUM ® material by a known tungsten-inert-gas (TIG welding process). The REPUBLIC 100-AR (TM) steel has a chemical composition and is manufactured to inherently possess a very high yield strength and abrasion resistance. The Tube BORIUM ® material, welded by the thick process, provides a very hard and drill-resistant layer comprising a heterogenous suspension of tungsten carbide particles of selected size in a steel matrix.

9 Claims, 4 Drawing Sheets

BASE METAL 500X

BASE METAL 500X

CARBIDE 500X

MATRIX 500X

DRILL RESISTANT HARD PLATE AND METHOD FOR MANUFACTURE THEREOF

FIELD OF THE INVENTION

This invention relates to drill-resistant hard material for forming security devices such as safes, and more particularly to a pre-dimensioned element of tough steel with a welded-on layer of highly drill-resistant material.

BACKGROUND OF THE PRIOR ART

The walls and doors of security containers, e.g., safes for containing valuables and secure containers for containing dangerous or toxic materials, must be formed to resist unauthorized drilling therethrough by persons seeking unauthorized access to the contents. Numerous conventional hardened materials are known for such uses. However, drilling elements are available that can penetrate most such available materials.

In order to minimize the weight, volume and cost of a secure container, it is therefore desirable to provide the walls and/or door thereof with a light-weight element disposed to present a highly drill-resistant surface to frustrate intrusive drilling. Such an element also should present very high resistance to impact forces applied from outside to punch through to the interior of the security container.

SUMMARY OF THE DISCLOSURE

A principal object of this invention is to manufacture a hard drill-resistant element, which is relatively light-weight and is suitable for inclusion into a security container to prevent unauthorized access to the contents by drilling into the interior of the container.

A related object is to provide a drill-resistant hard plate for forming a portion of a security container to prevent accessing the contents of the container by drilling.

A further related object of this invention is to provide a hard plate with a drill-resistant surface formed by welding a plate layer of highly drill-resistant material onto a prepared surface of a tough steel.

These and other related objects are realized, in one embodiment of this invention, by providing a process for manufacturing a hard, drill-resistant element, comprising the steps of:

welding onto a surface of a steel plate, by a known tungsten-inert-gas (TIG) process, a heterogenous layer of tungsten carbide particles suspended in a steel matrix.

In another aspect of this invention, a drill-resistant hard plate for a security container comprises:

a steel plate having a weld-receiving surface; and a drill-resistant layer comprising tungsten carbide particles heterogeneously suspended in a steel matrix, welded to the weld-receiving surface by a known tungsten-inert-gas (TIG) process.

In yet another aspect of this invention, steel plate has a through hole formed in it, and the drill-resistant layer surrounds the through hole without extending into it.

DESCRIPTION OF THE PREFERRED EMBODIMENTS

Figure 1:
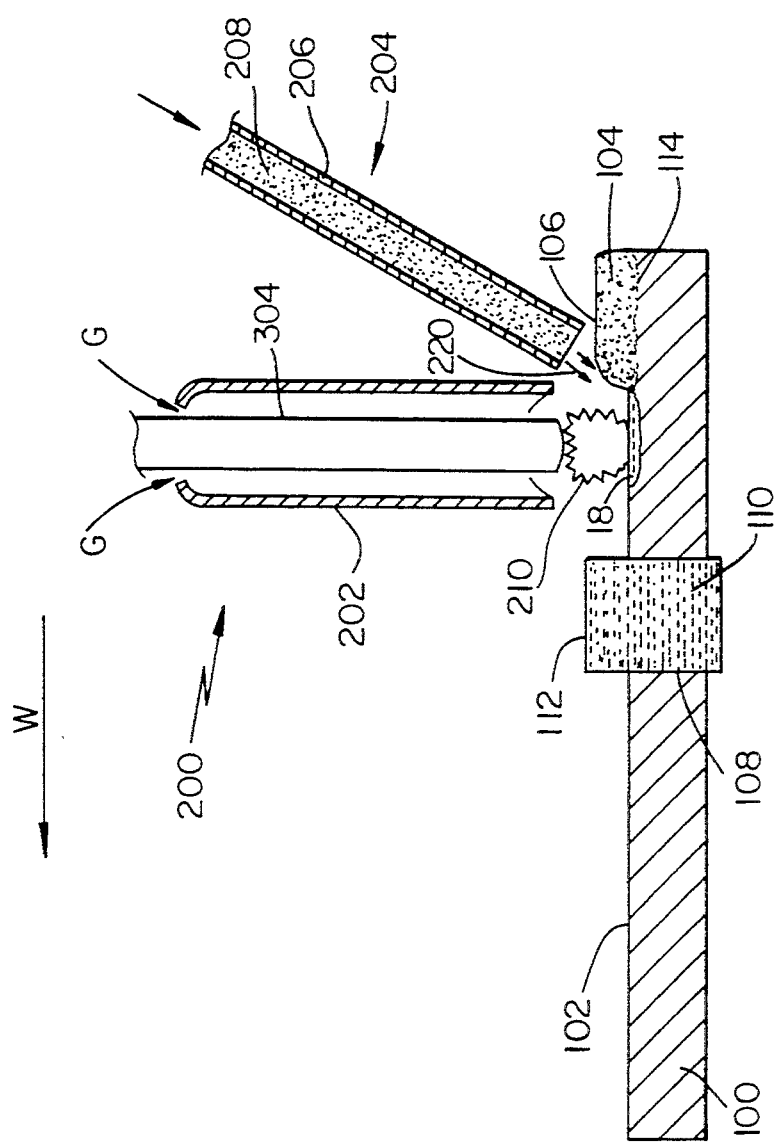
FIG. 1 illustrates in vertical cross-sectional view the deposition of a drill-resistant material to form a layer welded onto a prepared surface of a tough steel plate.

As best seen in FIG. 1, a plate 100 has a clean surface 102, onto which is welded a layer 104 of a high drill-resistant material having an exposed surface 106. In use, such a plate is positioned so that surface 106 will be encountered by a person seeking to drill into the container. Since the material of layer 104 is to be selected because of its high resistance to drilling-through, such a disposition is intended to frustrate unauthorized drilling into the interior of the security container. The plate 100 must be made of a material that is very tough and of a thickness sufficient to resist likely forces applied to punch a hole through it.

Note that since security containers may come in a variety of shapes and sizes, and since persons of ordinary skill in the art are expected to be familiar with these, an illustration is not provided of such a container. In principle, however, it will be readily understood how a flat steel plate such as 100, provided with a drill-resistant layer 104, may be incorporated into the walls, top, bottom and/or door or doors of such a security container.

After considerable experimentation, it was determined that a highly effective drill-resistant hard plate structure is formed by starting with a piece of commercially available "REPUBLIC 100-AR (TM)" abrasion resistant steel plate cut to the desired shape and size and preferably not less than 0.250 in. thick. Such steel plate is manufactured by Gulf States Steel, Inc., of Gadsden, Ala., and is intended for applications requiring abrasion and wear resistance. It is not considered suitable for use where the plate is subjected to structural loads, nor is it intended to be subjected to restrained or stressed elements. This very high strength and inherent abrasion and wear resistance are obtained through selective chemical composition and controlled rolling. This steel provides high strength-to-weight ratios at the 100,000 psi minimum yield strength level.

It was also determined that material available commercially under the name "Tube BORIUM ®", produced by the Stoody Company, of Industry, Calif., when applied to form a layer welded onto the REPUBLIC 100-AR (TM) steel plate, provides the optimum structure for use in security containers. Tube BORIUM ® is manufactured by metering crushed tungsten carbide particles of controlled mesh size into steel tubes, and is also produced as a bare rod for oxy-acetylene applications and as a bare electrode for DC electric application or as coated rods for AC/DC electric arc welding. Tube BORIUM ® is available in a variety of particle sizes, with fine mesh sizes increasing wear resistance and coarse sizes improving cutting efficiency where applied to provide cutting edges for tools. Particle sizes can range between 5 and 40 mesh (U.S. mesh) with a preferred size of 10–20 mesh. Coarse particles do not provide sufficient dispersion in the matrix to provide drill resistance. Finer particles have a tendency to escape during welding, thus lowering the tungsten carbide percentage in the layer. When Tube BORIUM ® is applied as weld material, the deposit generated thereby consists of a heterogenous suspension of tungsten carbide particles in a steel matrix, which is extremely hard and resistant to abrasion, drilling and the like.

The manufacturer of Tube BORIUM ® advertises commercial availability of different forms of the basic material for different types of welding applications to provide abrasion-resistant coatings, e.g., on drill bits, mining equipment, agricultural equipment, and for truck and heavy equipment parts. However, it was determined in developing this invention that to produce drill-resistant plate and/or elements for use in security containers, the optimum method of generating a drill resistant layer 104 on REPUBLIC 100-AR (TM) steel plate 100 is to employ a known tungsten-inert-gas (TIG) welding process.

In FIG. 1, there is seen in schematic form a portion of a conventional TIG welding apparatus 200. Specifically, note that the portion of TIG welding apparatus which is movably disposed closest to the plate 100 comprises a cylindrical tube 202 inside of which is coaxially supported an tungsten electrode element 304. In the cylindrical annular space between the outside of tungsten electrode element 304 and the inside surface of tube 202, during use of the apparatus, there is provided a flow an inert gas such as argon or helium, indicated by arrows "G". Adjacent the tube 202 is an element 204 of Tube Borium ®. Element 204 comprises a thin steel tube 206 packed with particulate tungsten carbide 208.

Since the TIG process is very well known, a detailed description of the principles underlying the same is not believed necessary here. It is important to realize, however, that upon the generation of a suitable voltage difference between the distal end of tungsten electrode element and REPUBLIC 100-AR (TM) plate 100, concurrently with a flow of inert gas as indicated by arrows "G", an arc 210 is formed. As a result of the intense heat of the arc 210, the surface layer 102 melts to form a puddle 118. The tungsten carbide and steel tube of which Tube BORIUM ® element 204 is comprised is fed toward the arc 210 and puddle 18 causing the element 204 to melt and be deposited downward, as indicated by the numeral 220, onto the surface of the plate 100. When cooled, a layer 104 is formed with an exposed surface 106. As indicated by the arrow "W", the welding apparatus 200 and the tube borium element 204 are traversed transversely across the surface 102, preferably in a weaving motion, to build up the deposit of welded-on Tube BORIUM ® to generate a suitable thickness of layer 104. The movement of the apparatus 200 and element 204 may be either manually or automatically controlled.

With reference to FIG. 1, the layer 104 comprises a top surface layer generally devoid of tungsten carbide particle, a second layer having a high concentration of tungsten carbide in a steel matrix. Although the exact composition or compositional gradient of the welded zone is not known, it is presumed that the matrix material is generally a steel matrix derived from the steel tube of the welding rod and the substrate is an abrasion steel alloy plate. As can be seen from FIG. 1, the drill resistant surface layer offers the drill resistance of a zone beneath the outer surface as a result of the concentration of tungsten carbide particles in the steel matrix.

Figure 3A:
FIGS. 3(a) through 3(d) illustrate micrographs of the composite structure of the drill resistant material.
Figure 3B:
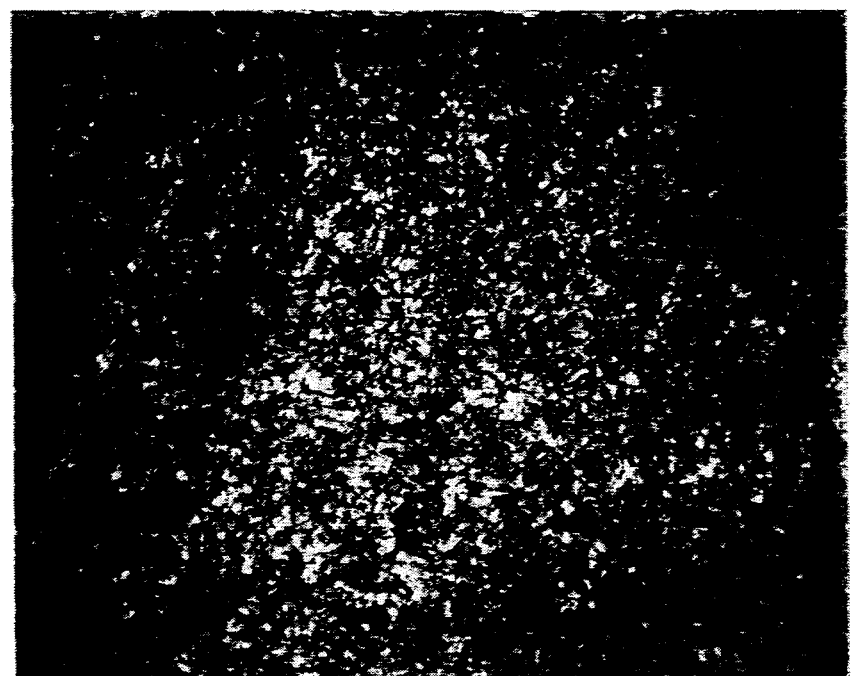

With reference now to FIGS. 3(a)-3(d), micrographs, each at 500 power magnification, shows various portions of the drill resistant hard material. The micrographs were produced by etching the surface of polished samples using a nital etch. FIG. 3(a) is a micrograph of the substrate abrasion resistant steel plate in the vicinity of the interface 114 as shown in FIG. 1. FIG. 3(b) is a micrograph of the substrate abrasion resistant steel plate removed from the interface 114. As can be seen from the comparison of these two micrographs, the abrasion resistant steel plate has a fine microstructure (FIG. 3(b)), with the steel plate showing a coarser grain structure in FIG. 3(a). This difference in grain size structure is a result of the heat supplied during the welding process causing grain growth in the interface 114 area.

Figure 3C:
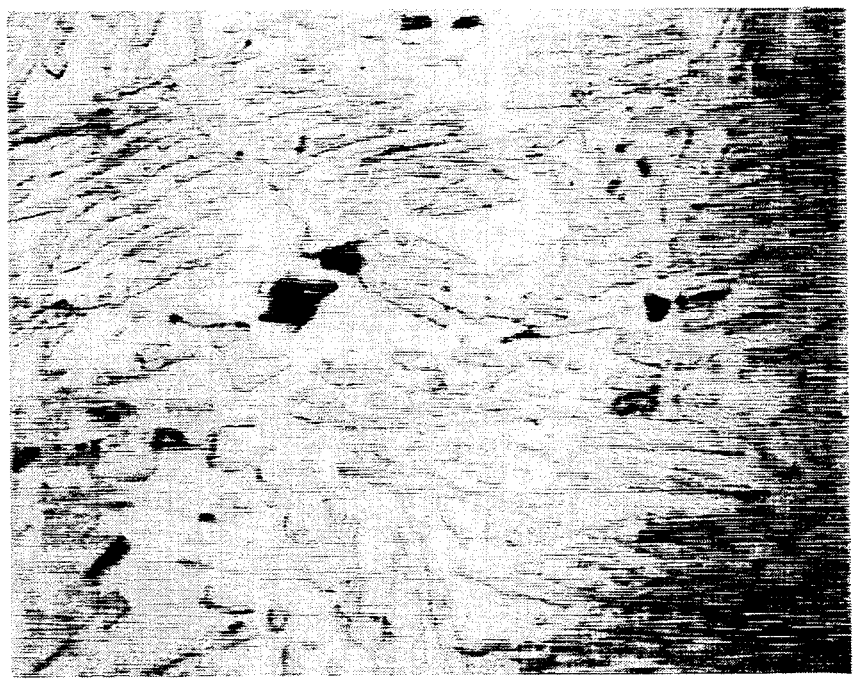

With reference now to FIG. 3(c), a polished surface of the carbide particle at 500 power magnification indicates the acicular grain structure of the material.

Figure 3D:
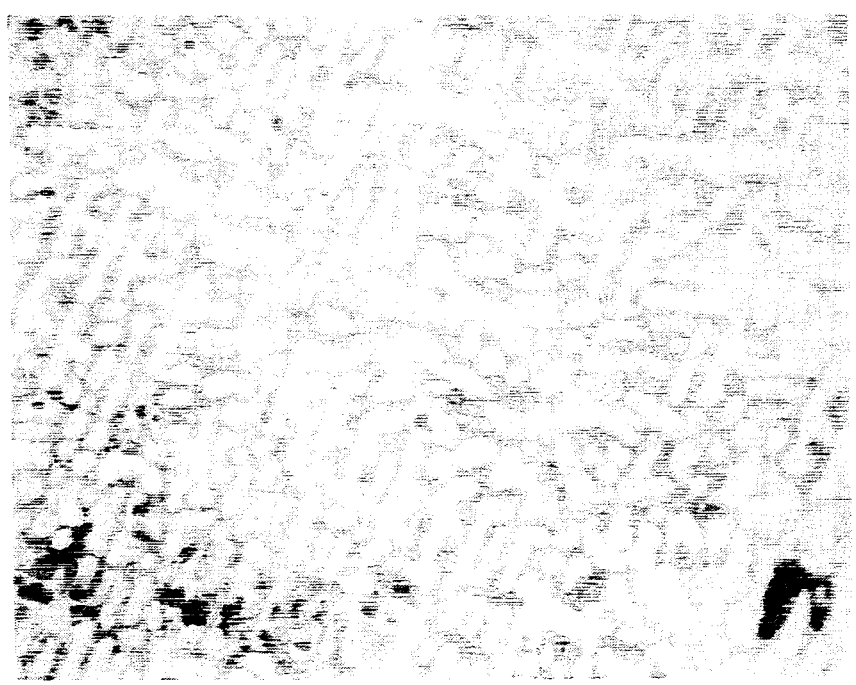

The grain structure of the matrix material surrounding the dispersed tungsten carbide particles, shown in FIG. 3(d), is extremely coarse. The coarse grain size structure is a result of the intense heat supplied by the welding process.

Microhardness tests were performed on the composite structure to indicate the high degree of hardness of the welded layer which provides the drill resistant properties to the plate structure. Knoop Hardness Numbers using a 1 kilogram load along with equivalent Rockwell C hardness numbers are listed below:

|  | Average KHN | Average Rockwell C |
| --- | --- | --- |
| Base Metal | 418.20 | 41.2 |
| Matrix | 510.79 | 48.0 |
| Carbide Particles | 1824.60 | >70 |

As can be seen from the listing of microhardness values, the matrix coating having a dispersion of ultra hard carbide particles therein provides superior drill resistance for the composite plate structure.

Figure 2A:
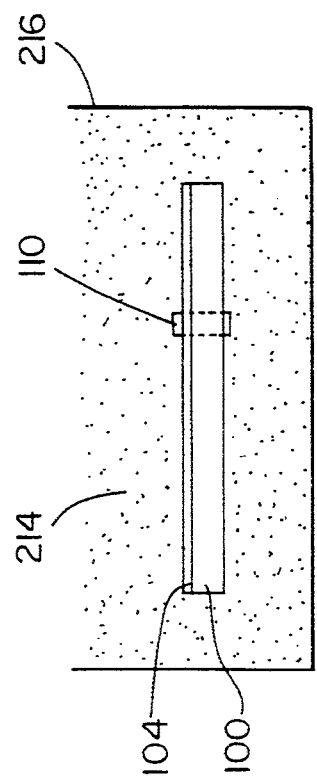
FIGS. 2(i a) through 2(d) schematically depict key steps in the manufacturing process according to this invention.

The best mode for practicing the process according to this invention includes the following steps:

A piece of REPUBLIC 100-AR (TM) steel plate is first cut to suitable dimensions. If necessary, it is cleaned, e.g., by applying a grinding wheel 212, down to bare metal to remove any surface dirt to prepare a clean surface 102 onto which Tube BORIUM ® material is to be welded as shown in FIG. 2(a).

Figure 2B:
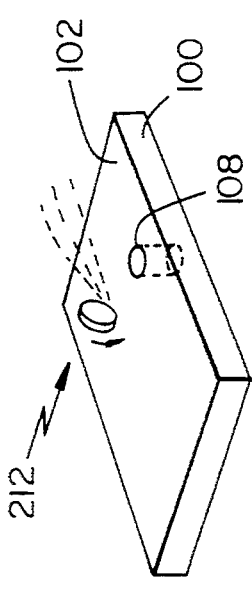

Referring to FIG. 2(b), by using known apparatus and the associated process for practicing TIG welding, and using an element of Tube BORIUM ® of selected mesh size tungsten carbide content, the layer 104 is welded onto a weld-receiving surface 102 of plate 100. Experience shows that an overall thickness of the composite plate, i.e., comprising both the underlying plate 100 as well as the welded-on layer 104 should be approximately 0.5 in. for many practical applications, e.g., for incorporation into safes and the like. Depending on the voltage utilized, which will be a function of the particular equipment employed, the welding must be performed at such a rate that any cracks that are present in the finished product are less than about 0.01 in. wide and the residual warpage of the composite plate preferably should not be more than about 0.06 in. as determined by placing the plate on a flat surface with the welded-on material layer 104 uppermost. Pressures of the insert gas may vary between those typical of TIG welding and pressures in excess thereof. When using argon as the inert gas preferred pressures include about 60 psi. Obviously, depending on the TIG welding equipment to be used, some initial experimentation may be advisable until the user develops familiarity with the system and can control the operation satisfactorily.

Figure 2C:
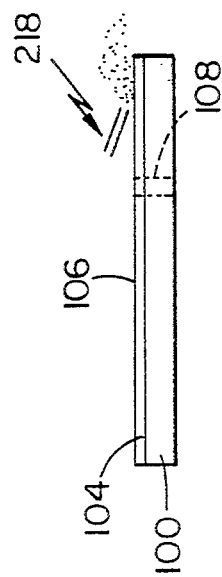

In order to minimize cracking and warpage, it is preferable to place the composite plate in sand 214, e.g., in a sand box 216 as shown in FIG. 2(c), for slow cooling thereof for at least one hour.

Figure 2D:
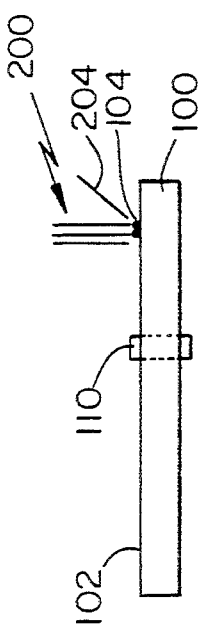

Some scale may form on the exposed surface 106 of the welded-on material, and experimentation shows that this may be satisfactorily removed by grit blasting in known manner, e.g., with a grit-blowing tool such as 218, as shown in FIG. 2(d), until the exposed surface is uniformly gray, if desired for cosmetic purposes. The use of aluminum oxide grit for this purpose is found to be highly satisfactory. The grit-blasted surface may then be painted or coated otherwise as desired.

Whether argon or helium is used as the inert gas in the TIG process may be a matter of choice and may be dictated by the particular equipment utilized, but either gas should be acceptable. Likewise, depending on the particular application under consideration, commercially-available Tube BORIUM ® elements may be used with the tungsten carbide grit therein being of selected mesh size.

When a drill-resistant plate is to be part of a security container door or cover, e.g., the door of a safe or vault, it may be necessary to ensure that a hole 108 provided for a locking mechanism does not end up with its dimensions changed due to deposition of the Tube BORIUM ® material in any portion or edges thereof. Such an inadvertent deposition of the selected drill-resistant Tube BORIUM ® material could cause serious problems in subsequently fitting in a lock through such a precut hole 108. For such applications, a simple solution is to form a graphite plug 100 of the same size as the hole and to plug the hole therewith. Plug 110 should have a surface 112 located higher than the surrounding surface 102 to hold the liquified weld material away from hole 108, and the Tube BORIUM ® will thus not be deposited thereon during the process of welding on the Tube BORIUM ® layer 104 to surface 102 of plate 100. Subsequently, the graphite plug 100 can simply be knocked out, leaving the dimensions of hole 108 unchanged and free of any deposits of Tube BORIUM ® material.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A process for manufacturing a hard drill-resistant element, comprising the step of:
   (a) providing a filler material comprising a steel tube having 5–40 mesh tungsten carbide particles therein;
   (b) providing a steel plate; and
   (c) forming a layer of said tungsten carbide particles suspended in a steel matrix on said steel plate by welding said filler material using tungsten inert gas welding conditions, said layer having a compositional gradient of tungsten carbide particles from an outer surface of said layer to said steel plate, such that said tungsten carbide particles are concentrated in said layer at a location removed from said outer surface to provide said drill resistance.

2. The process according to claim 1, comprising the further step of:

placing the welded element in sand after the welding step for a minimum of one hour of slow cooling to prevent formation of cracks more than about 0.01 in. wide or warpage more than about 0.06 in. per side as measured with the element in an unloaded state with said welded-on layer uppermost.

3. The process according to claim 2, comprising the further step of:

grit-blasting an exposed surface of said welded-on layer to remove scale therefrom.

4. The process according to claim 3, wherein:

said grit-blasting comprises impinging aluminum oxide particles to said exposed surface.

5. The process of claim 1 wherein said tungsten carbide particles range between about 10 and 20 mesh.

6. A drill-resistant hard plate for a security container, comprising:

a steel plate having a weld-receiving surface; and a drill-resistant layer comprising tungsten carbide particles ranging from 5 to 40 mesh suspended in a steel matrix, welded to said weld-receiving surface by tungsten-inert-gas welding, said layer having a compositional gradient of tungsten carbide particles from an outer surface of said layer to said steel plate, such that said tungsten carbide particles are concentrated in said layer at a location removed from said outer surface to provide said drill resistance, said welding forming said drill resistant plate with a generally flat upper surface, wherein said tungsten-inert-gas welding further comprises the steps of providing a filler material comprising a steel tube having 5–40 mesh tungsten carbide particles therein and forming said drill resistant layer on said steel plate by welding said filler material using tungsten-inert-gas welding conditions.

7. Drill-resistant hard plate according to claim 6, wherein:

said steel plate has a through hole formed therein, and said drill-resistant layer is formed to surround said through hole without extending therein.

8. The drill-resistant plate of claim 6 wherein said tungsten carbide particles range between about 10 and 20 mesh.

9. A drill-resistant hard plate element for a security container, comprising:

a steel plate having a weld-receiving surface; and a drill-resistant layer comprising tungsten carbide particles ranging from 5 to 40 mesh suspended in a steel matrix, welded to said weld-receiving surface by tungsten-inert-gas welding, said layer having a compositional gradient of tungsten carbide particles from an outer surface of said layer to said steel plate, such that said tungsten carbide particles are concentrated in said layer at a location removed from said outer surface to provide said drill resistance said welding forming said drill resisted plate with a generally flat upper surface, wherein, upon completion of said tungsten-inert-gas welding, the plate is further processed by placing the plate in sand for a minimum of one hour of slow cooling to prevent formation of cracks more than about 0.01 in. wide or warpage of more than about 0.06 in. per side, as measured with the plate in a unloaded state with said welded-on layer uppermost.

* * * * *